United States Patent [19]

Shoji

[11] 4,399,960
[45] Aug. 23, 1983

[54] MAGNETIC TAPE CASSETTE

[75] Inventor: Shigemasa Shoji, Saku, Japan

[73] Assignee: TDK Electronics Co., Ltd., Tokyo, Japan

[21] Appl. No.: 224,950

[22] Filed: Jan. 14, 1981

[30] Foreign Application Priority Data

Jan. 14, 1980 [JP] Japan ................................. 55-3245

[51] Int. Cl.³ ...................... G03B 1/04; G11B 15/32; B65H 75/34
[52] U.S. Cl. .................. 242/199; 226/195; 242/210
[58] Field of Search ............................. 242/197–200, 242/194, 192, 76, 201–210; 360/93, 96, 132; 226/190, 189, 195

[56] References Cited

U.S. PATENT DOCUMENTS

| 3,423,038 | 1/1969 | Katzef et al. | 242/199 |
| 3,674,942 | 4/1972 | Sugaya et al. | 360/132 |
| 3,889,900 | 6/1975 | Nelson | 242/199 |
| 4,290,567 | 9/1981 | Saito | 242/198 |

Primary Examiner—Leonard D. Christian
Attorney, Agent, or Firm—Robert Scobey

[57] ABSTRACT

A reel to reel magnetic tape cassette having a tape guide adjacent the supply reel comprising a rotatable element and a guide adjacent the take up reel which is a non-rotatable element whereby frictional resistance of the tape is reduced at the unreeling side and loosening or slack of the tape during transport is minimized.

3 Claims, 2 Drawing Figures

MAGNETIC TAPE CASSETTE

BACKGROUND AND BRIEF DESCRIPTION OF THE INVENTION

The present invention relates to a magnetic tape cassette, such as video tape cassette or the like.

In the past, a magnetic tape cassette has been typically made from an upper case half, a lower case half, a strip of magnetic tape, a pair of reels around which the magnetic tape is wound, a tape guide at the tape reeling side, and another tape guide at the tape unreeling side. The magnetic tape extends from one reel through its associated tape guide and then through the other tape guide to its associated reel. The tape guides are tightly fitted onto guide posts so that they are not rotated by means of the travelling magnetic tape. Further, at the tape unreeling side, a tape pad and a guide post are normally provided, both of which cooperate to hold the travelling magnetic tape therebetween to prevent the tape from being loosened during travelling.

Obviously it is preferable that a magnetic tape cassette has a minimal dynamic frictional resistance so as to ensure the smooth movement of the magnetic tape. Frictional resistance increases in proportion to the number of contact locations such as the tape guides, guide pins on a video player deck, and others, as well as the total tape contact area.

It is recognized that, in a conventional magnetic tape cassette, especially in quick feed and quick return, the magnetic tape forms generally a 110 degree contact angle with the tape reeling guide and a 120 degree contact angle with the tape unreeling guide, resulting in a 230 degree total tape embracing angle. Because the tape guides are fixed to one case half without any permitted rotation thereof, the magnetic tape tends to adhere to the cylindrical surface of each tape guide when the tape starts to move from a standstill or moves in the reverse direction. This adherence results in an unexpected increase in static frictional coefficient between the magnetic tape and the tape guides. Thus sometimes the magnetic tape fails to move, e.g., when the tape deck has a reduced reeling torque.

One way of preventing the above-mentioned stopping problem is to reduce frictional resistance between the magnetic tape and the tape guides, e.g., by designing the tape guides at the reeling and unreeling sides each in the form of a rotating body. This arrangement, however, causes frictional resistance to be excessively reduced, and other problems may develop, such as forward loosening, pinching at the front cover, undesirable rolling or the like, because the magnetic tape is very free to move around the tape guides. These problems are due to the loosened part of the magnetic tape coming out of the tape guides because of the positional relation to the rotation stopper means for the reels arranged in both the case halves to the ratches on the outer periphery of the reels, when the cassette is removed from the player deck. Further, since the conventional magnetic tape cassette is constructed such that the tape pad and the guide pole located at the unreeling side serve for holding the travelling magnetic tape therebetween, there is little possibility that loosening takes place at the tape unreeling side. However, the magnetic tape is easily loosened with the additional aid of rotational movement of the tape guide at the tape reeling side, becaus there is provided no means for holding the travelling magnetic tape at this location. Therefore, if the tape guides at both the tape reeling and unreeling sides are designed each in the form of a rotational body, it is necessary that the guides themselves have some frictional resistance on their cylindrical surfaces to some extent or that another magnetic tape holding means such as a tape pad which serves for holding the travelling magnetic tape to prevent any loosening is arranged additionally at the tape reeling side. However, such remedial measures have drawbacks, such as complicated construction, increased number of parts and components, increased manufacturing cost, and others.

The subject invention is intended to obviate the above mentioned drawbacks with the conventional magnetic tape cassette, and its object is to provide an improved magnetic tape cassette which has reduced frictional resistance to the magnetic tape and at the same time has a minimized loosening of the tape, while maintaining the fundamental construction of the magnetic tape cassette as described above.

To accomplish the above mentioned object there is proposed in accordance with the present invention an improved magnetic tape cassette which is characterized in that it contains two tape guides, one at each of the tape reeling and unreeling sides, wherein just the tape guide at the tape unreeling side is designed in the form of a rotational body. The invention is particularly suitable for applications in which the magnetic tape moves at a constant travelling speed (in the recording and reproducing modes) only in one direction, as is the case with video tape cassettes. This type of magnetic tape cassette normally would not be employed when the magnetic tape moves at a constant travelling speed in both directions, unless some provision is made to permit only the tape guide at the tape unreeling side to be rotational.

The present invention will be described in more detail below.

DETAILED DESCRIPTION

Figure 1:
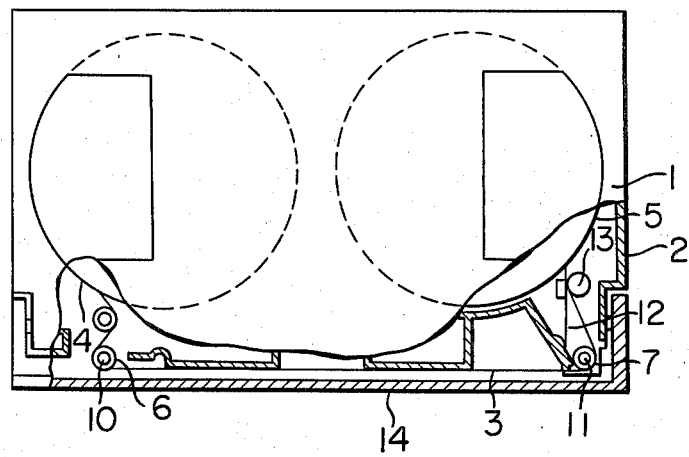
FIG. 1 is a partially sectioned plan view of a magnetic tape cassette in accordance with the present invention.
Figure 2:
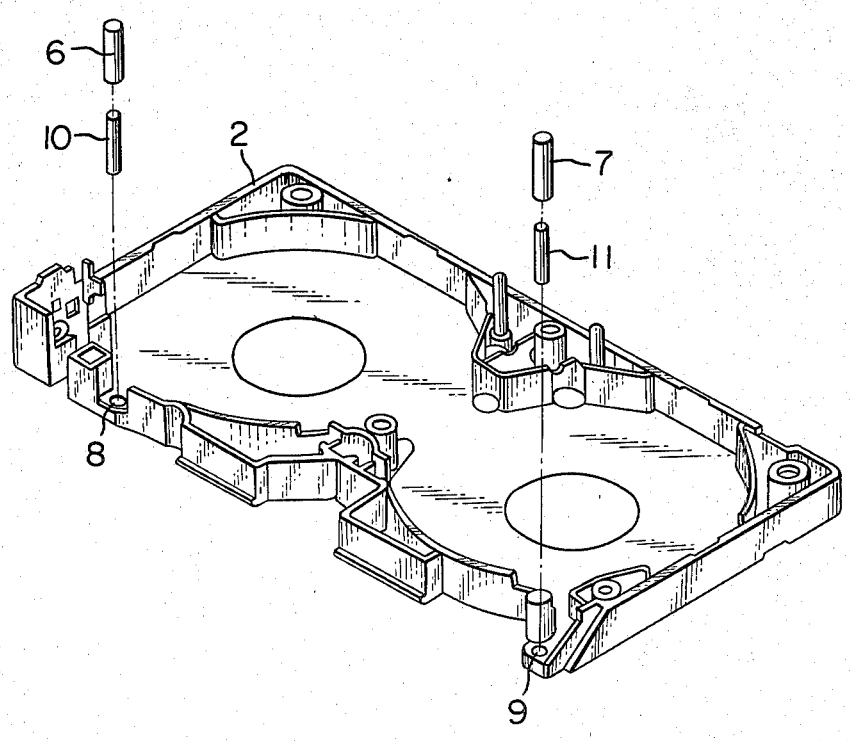
FIG. 2 is a perspective view of the lower case half of the magnetic tape cassette of FIG. 1, shown in an enlarged scale, wherein the tape guides and guide poles are illustrated in a disassembled state.

As illustrated in the drawing, FIGS. 1 and 2, the cassette includes upper and lower case halves 1 and 2, magnetic tape 3, and reels 4 and 5 around which the tape is wound (during recording and reproducing, tape is reeled onto reel 4 and unwound from reel 5). Tape guides 6 and 7 supported by posts 10 and 11 fitted in holes 8 and 9 guide the tape during its movement. Tape pad 12 and guide post 13 also hold the tape 3 therebetween.

In accordance with the invention, the tape guide 7 located at the tape unreeling side and positioned adjacent the front edge of the cassette is designed in the form of a rotational body which is loosely fitted onto the post 11. The tape guide 6 located at the reeling side and positioned adjacent the front edge of the cassette is tightly fitted onto the post 10 so as not to be rotated.

A magnetic tape cassette constructed as described above exhibits substantially reduced frictional resistance at the unreeling side as the tape guide 7 rotates during movement of the magnetic tape 3, and the tape moves very smoothly. Moreover, since the magnetic tape is securely held by means of the tape pad 12 and the guide post 13 located at the tape unreeling side, it is unlikely that the magnetic tape 3 will become loosened regardless of the fact that the tape guide 7 has reduced frictional resistance as a rotational body.

On the other hand, since the tape guide 6 located at the tape reeling side is designed not to be rotated, the magnetic tape 3 is prevented from loosening at this side of the cassette without any provision of a tape holding means such as a tape pad, guide post or the like.

A comparative examination was conducted using conventional video cassettes and improved magnetic tape cassettes embodying the present invention. The conventional cassettes included no tape guide roller, while the improved cassettes included a tape guide roller only at the unreeling side. The following results were obtained at a predetermined travelling speed of the magnetic tape (the table tabulates the number of times that tape movement stopped during a "pass" of the tape, i.e., the movement of the tape from beginning to end):

| number of pass | at the starting time | above 50 passes | above 100 passes | above 300 passes |
| --- | --- | --- | --- | --- |
| conventional type (with no roller) | 0 | 0 | 2 | 4 |
| improved type (with a single roller at one side) | 0 | 0 | 0 | 0 |

The above tests were conducted with the use of rollers made of polyacetal resin and guide poles made of stainless steel, and demonstrate that objectionable stopping of tape movement was encountered with conventional cassettes and was eliminated through use of the present invention.

Thus the present invention succeeds in providing a magnetic tape cassette which is entirely free from any trouble such as troubles caused by frictional resistance during the movement of the magnetic tape, undesirable loosening of the travelling magnetic tape, and others.

As described above, since a magnetic tape cassette in accordance with the present invention is constructed such that it contains two tape guides, one at each of the tape reeling and unreeling sides, wherein just the tape guide located at the unreeling side is designed in the form of a rotational body, it is ensured that the magnetic tape cassette is satisfactorily operated at a substantially reduced frictional resistance with minimized loosening of the travelling magnetic tape, while maintaining the fundamental construction of the tape cassette mechanism. Thus the magnetic tape cassette provides operation at a high level of reliability free from any trouble caused by irregular movement and loosening of the travelling magnetic tape.

The presently preferred embodiment of this invention described above is subject to modification. Thus the invention should be taken to be defined by the following claims.

I claim:

1. In a magnetic tape cassette having a pair of reels therein for holding a magnetic tape which travels from one reel from which it is unreeled along a front edge of said cassette to the other reel upon which it is reeled during recording and reproducing, the improvement for guiding said tape along said front edge of said cassette comprising a rotatable tape guide positioned adjacent to both said front edge of said cassette and said one reel from which said tape is unreeled, and a nonrotatable tape guide positioned adjacent to both said front edge of said cassette and said other reel upon which said tape is reeled.

2. A magnetic tape cassette according to claim 1, in which said cassette includes a tape pad and guide post assembly receiving a magnetic tape from said reel from which the tape is unreeled during recording and reproducing, the tape passing from said assembly thence to said rotatable tape guide and thence to said other nonrotatable tape guide and thence to said reel upon which said tape is reeled.

3. A magnetic tape cassette according to claim 1 or 2, in which said cassette is of the type in which the magnetic tape moves at a constant travelling speed during recording and reproducing only in one direction.

* * * * *